(12) United States Patent
Niebling et al.

(10) Patent No.: US 7,607,837 B2
(45) Date of Patent: Oct. 27, 2009

(54) WHEEL BEARING MODULE IN A WHEEL CARRIER

(75) Inventors: Peter Niebling, Bad Kissingen (DE);
Jens Heim, Bergrheinfeld (DE);
Heinrich Hofmann, Schweinfurt (DE);
Roland Langer, Schwanfeld (DE);
Darius Dlugai, Schweinfurt (DE); Horst Doeppling, Herzogenaurach (DE);
Wolfgang Steinberger, Herzogenaurach (DE)

(73) Assignee: Schaeffler KG, Schweinfurt (DE)

( * ) Notice: Subject to any disclaimer, the term of this patent is extended or adjusted under 35 U.S.C. 154(b) by 310 days.

(21) Appl. No.: 10/596,547

(22) PCT Filed: Dec. 6, 2004

(86) PCT No.: PCT/DE2004/002675

§ 371 (c)(1),
(2), (4) Date: Sep. 22, 2006

(87) PCT Pub. No.: WO2005/058614

PCT Pub. Date: Jun. 30, 2005

(65) Prior Publication Data

US 2007/0160316 A1    Jul. 12, 2007

(30) Foreign Application Priority Data

Dec. 18, 2003   (DE) ................. 103 59 645

(51) Int. Cl.
*F16C 43/04* (2006.01)
*B60B 27/00* (2006.01)
(52) U.S. Cl. .............. 384/544; 384/542; 301/105.1
(58) Field of Classification Search .......... 384/544, 384/589, 542; 301/105.1
See application file for complete search history.

(56) References Cited

U.S. PATENT DOCUMENTS

| 3,936,105 | A | * | 2/1976 | Asberg ............... 384/482 |
| 5,494,358 | A | * | 2/1996 | Dougherty ............ 384/448 |
| 5,927,820 | A | * | 7/1999 | Vignotto et al. ...... 301/105.1 |
| 2005/0018939 | A1 | * | 1/2005 | Niwa et al. ........... 384/544 |

FOREIGN PATENT DOCUMENTS

DE    3940395    6/1990
FR    2631402    11/1989

* cited by examiner

*Primary Examiner*—Thomas R Hannon
(74) *Attorney, Agent, or Firm*—Lucas & Mercanti, LLP (57) ABSTRACT

A wheel bearing module in a wheel carrier that has a wheel bearing and a wheel flange. The wheel flange is mounted using the wheel bearing which allows it to rotate relative to the wheel carrier about a rotation axis. The wheel bearing has at least one outer ring. The wheel bearing is supported, at least in areas and via an outer ring, at least radial to the rotation axis in the wheel carrier. The outer ring has, at the axial end of the outer ring, a flange radially pointing away from the rotation axis.

17 Claims, 8 Drawing Sheets

WHEEL BEARING MODULE IN A WHEEL CARRIER

FIELD OF THE INVENTION

A wheel bearing module in a wheel carrier, having a wheel bearing and having a wheel flange, the wheel flange being mounted by means of the wheel bearing with respect to the wheel carrier such that it can rotate about a rotational axis, the wheel bearing module having the features:
 the wheel bearing has at least one outer ring,
 the wheel bearing is supported in the wheel carrier at least in sections via the outer ring at least radially with respect to the rotational axis,
 the outer ring has a flange which points radially away from the rotational axis axially on the end side of the outer ring,
 the flange is fixed with respect to the wheel carrier axially with fastening elements, the fastening element reaching at least partially behind the flange on a side of the flange which faces axially away from the wheel carrier, and the fastening element bearing axially fixedly on the flange in the process,
 the wheel flange lies axially opposite the outer ring, the wheel flange protruding radially away from the rotational axis at least in sections to a greater extent than the flange.

BACKGROUND OF THE INVENTION

DE 39 40 395 A1 describes a wheel bearing having an outer ring, rolling bodies and two inner rings, in which the outer ring has a radial flange axially between the end sides and away from the end sides, with which radial flange the wheel bearing is suspended. The wheel bearing is fixed axially and radially on the wheel carrier via the flange. A hollow cylindrical section of the outer ring which adjoins the flange axially is seated in a hole of the carrier, with the result that the outer ring bears axially against the carrier by means of the flange and at least partially radially at least with this section.

The mounting of the wheel bearing in the carrier is particularly complicated, when the wheel bearing is to be mounted on the carrier together with a hub, on which the wheel flange is premounted fixedly. The fastening elements, such as threaded bolts or the like, cannot readily be fed in axially, as the wheel flange is axially in the way.

SUMMARY OF THE INVENTION

It is therefore the object of the invention to provide a wheel bearing module, the fastening of which to the wheel carrier is simplified.

This object is achieved in accordance with the subject matter of claim 1.

The wheel flange has first recesses which pass through the wheel flange axially and through which the fastening elements can be fed axially onto the flange of the outer ring. At that location where the fastening element is in contact, the flange lies axially opposite at least one of the first recesses at least once per revolution of the wheel flange about the rotational axis, in such a way that the wheel flange does not cover the flange axially in the direction of the wheel carrier at least at that location where the fastening element is in contact. That is to say, the flange is not covered axially by the wheel flange at least once per revolution of the wheel flange about the rotational axis at least at that location where the fastening element is in contact, as at least one of the first recesses lies axially opposite the flange at least once per revolution at that location where the fastening element is in contact. The axial projection of the outline of the fastening element onto the flange lies within the axial projection of the recess, the projection of the contour of the recess which is directed axially onto the flange not covering the outline axially. At least one of said recesses is made in the radial flange.

For the attachment/introduction of the fastening elements, the wheel flange is initially rotated about the rotational axis to such an extent that the recess lies opposite, for example, one of the fastening holes on the flange of the outer ring and therefore also opposite the fastening hole in the wheel carrier. The fastening means is then guided through the recess on the wheel flange by means of an apparatus or a tool and fastened to the wheel carrier. After this, the wheel flange is rotated again until the recess lies axially opposite a further fastening hole. The process is then repeated as described above until the flange of the outer ring is fixed on the carrier.

The invention is of advantage for the mounting of wheel bearing units in a wheel carrier, in which a hub is supported in the outer ring via at least two rows of rolling bodies on the raceways so as to rotate about the rotational axis, and the wheel flange leads radially away from the hub, and on which the hub is mounted in the wheel bearing in an axially nonreleasable manner with respect to the outer ring.

One embodiment of the invention provides for each of these recesses on the wheel flange to lie simultaneously axially opposite the flange at least once per revolution of the wheel flange about the rotational axis, in such a way that the wheel flange does not cover the flange in the axial direction at that location where the fastening elements are in contact. All the fastening elements can therefore be passed through the wheel flange at the same time with an apparatus. The flange is therefore fastened to the carrier in a time saving manner.

For example, a plurality of recesses are arranged around the rotational axis with the same pitch with respect to one another. The recesses are either open radially to the outside or the recesses are holes which pass axially through the wheel flange.

Wheel bolts for fastening a vehicle wheel to the wheel flange are accommodated in the holes, for example, after the outer ring has been fastened to the wheel carrier. In this case, the fastening holes are distributed on the circumferential side, for example, with a pitch which corresponds to the pitch, with which the holes for accommodating the wheel bolt are distributed on the circumferential side.

The wheel bearing is pressed, for example, into a hole of the wheel carrier. To this end, the assembly force is exerted on the flange of the outer ring and not on the wheel flange. As a result, the rolling bodies and the raceways of the wheel bearing are free of axial assembly forces. One embodiment of the invention therefore provides for the wheel flange to have a greater number of recesses than, for example, fastening elements are provided for fastening the wheel flange. This is of particular advantage, when the wheel bearing unit is to be pressed with the wheel flange into the hole of the wheel carrier and centering mandrels are to be passed through the recesses beforehand. The through holes in the flange of the outer ring are centered with respect to the fastening holes by way of said centering mandrels. In this case, the axial supports reach axially through the surplus holes and are supported on the flange of the outer ring, with the result that the assembly forces can be applied to the flange after the centering process.

The invention provides a method for mounting the wheel bearing module, in which the wheel bearing as a unit with a hub and the wheel flange is mounted in the wheel carrier and is fastened to the wheel carrier. The method steps are described in greater detail in the Detailed Description of the Invention.

The invention is preferably provided for applications, in which the flange is configured axially on the end side of the outer ring. The flange either bears directly axially against the wheel carrier or is supported axially on the wheel carrier via spacer means. The wheel bearing is secured axially with respect to the carrier in the hole via the flange, as the flange is fastened to the flange with suitable means. Axial movement of the outer ring during driving operation is avoided. Moreover, the channel at the transition from the flange to the outer ring is relieved from the outset, as the outer ring is supported radially in the carrier under load.

In this context, wheel carriers are to be understood as all connecting constructions for wheel bearing modules and wheel bearing units of driven and nondriven wheels, to/in which the wheel bearing modules or wheel bearing units are fastened. The wheel carriers which are cast or forged or manufactured in another suitable way are manufactured from all conceivable materials, that is to say from steel and/or from aluminum alloys at least around the hole for accommodating the wheel bearing. A wheel bearing which is fixed axially on the wheel carrier by means of the flange of the outer ring according to the invention is also fixed axially if the radial seat of the wheel bearing has become loose radially, for example, in a carrier made from an aluminum alloy on account of different influence factors.

In this context, wheel bearings are to be understood as all one row, two row and multiple row wheel bearings having rollers and/or balls as rolling bodies, having one or more inner rings of one part or multiple parts, which are configured in a very wide range of arrangements, such as in a radial ball bearing arrangement/angular contact ball bearing arrangement or as in a radial roller bearing arrangement/angular contact roller bearing arrangement. As an alternative, one or all of the inner raceways is/are not formed on one/a plurality of inner rings but is/are formed directly on a hub which is arranged in the wheel bearing.

Before the installation of the wheel bearing in the wheel carrier, the hub of a wheel bearing module for a driven or nondriven wheel is fixed in the wheel bearing, for example preferably by a flange rim on the hub. Here, the flange rim reaches behind the bearing arrangement in such a way that the hub is fixed inextricably on the wheel bearing such that it cannot be separated from the wheel bearing. Alternatively, wheel bearing units in which the hub, as individual part, is mounted releasably with the wheel bearing, are also provided.

One embodiment of the invention provides for the outer ring to be relatively thin-walled and therefore elastic in comparison with the rigid housing which surrounds the hole. The wall of the outer ring has thin cross sections. The outer ring, in particular a ring which is manufactured by cold forming, partially hardened or hardened overall; or an outer ring which is manufactured as desired without material removing processing after the hardening, is therefore as an individual part on the outside and, in particular, on the inside unstable in itself or unround at the raceways, in such a way that the optimum geometry which is necessary for rolling contact is not realized initially. This relates to, in particular, the diameter and the roundness of the section which is considered transversely with respect to the rotational axis, with which section the outer ring is pressed into the hole, before mounting in the wheel carrier. In this case, optimum geometry is to be understood as the roundness of the raceways in rolling contact, which ensures optimum rolling conditions in the bearing.

Shape accuracies of this type are usually produced by turning and grinding on solid bearing rings which are machined with removal of material and the housing holes for accommodating the bearing rings. The manufacture of geometry of this type is time consuming and expensive.

In one embodiment of the invention, the finished contour of the outer ring has, at least at the section, the above-mentioned deviations from the optimum geometry. The hole of the carrier corresponds to the optimum requirements on account of its geometry which is produced by removing material.

The deviations of the outer contour of the outer ring from the optimum geometry are compensated for by the elastic, partially plastic, behavior of the outer ring when the outer ring is pressed into the hole. To this end, the outer ring has, initially at least at the section, an external diameter which is greater than the internal diameter of the hole. The excess dimension is also required for the press fit, with which the outer ring is seated in the carrier. The outer ring is constricted radially inward by being pressed into the hole, and is adapted to the roundness of the hole. The shape accuracies of the hole and also the excess dimension are transmitted almost completely to the geometry of the raceways, as the housing of the carrier is rigid in comparison with the outer ring.

The hole in the wheel carrier which is comparatively rigid with respect to the outer ring has substantially the initial geometry before being pressed into the wheel bearing, if the wheel bearing is seated in the hole. The functionally required roundnesses on the raceway are therefore only produced on the outer ring when the outer ring is pressed into the hole. Moreover, the elastic change in shape is also advantageous, inter alia, for the necessary freedom from play of the wheel bearing when the wheel bearing is mounted completely as a unit.

The outer ring is preferably configured in one piece with the flange, but the flange can also be fastened to the outer ring by welding or by a force transmitting and/or form fitting seat. One embodiment of the invention provides for the outer ring to be made from formed material. The design of the outer ring with all its shaped elements is accordingly also produced by forming. Cutting or material removing machining is restricted to only a very small amount of the machining in comparison with the amount of chipless machining. Only excess material, edges, burrs and the like are therefore removed from the shaped part by cutting or punching. Only the raceways are optionally machined in a material removing manner by precision machining such as grinding, lapping or polishing. Cold forming is to be understood as all the forming processes, in which the contour of the hollow outer ring can be manufactured by stretching or upset forging, expansion or contraction, and the shape of the starting material can be changed plastically in the process without material being cut. Processes of this type are, for example, drawing, deep drawing, rolling, pressing and combinations of the above-mentioned processes.

Tubes and metal sheets are provided, for example, as blanks for the manufacture of the outer rings. A blank comprising a tube is machined to form the finished outer ring by expansion, rolling, contracting, upset forging and the folding over of edges. Outer rings which are manufactured from a metal sheet are manufactured by drawing and further individual processes mentioned above or combinations of the latter. In this case, one embodiment of the invention provides for the flange to be exactly as wide, axially from the end side of the outer ring as far as the wheel carrier against which the flange bears, as the starting material of the metal sheet was thick before the outer ring was manufactured. Preferred materials are cold formable bearing materials, such as 100Cr6 or else all suitable deep drawing steels.

The outer ring is elastic and highly loadable in the loading direction of the rolling bodies on account of an annular groove which acts as a relief channel. To this end, in each case one shoulder is optionally provided radially in the supporting direction with an annular groove of this type. Furthermore, the outer ring is distinguished by a low weight, as starting material having a small wall thickness or small sheet thickness has been used. The thickness of the starting material preferably lies in the range from 2.4 to 5 mm. The overall proportion of the wheel bearing unit in the weight of the unsprung masses is reduced by way of the thin walled outer ring which is manufactured by removing material or without cutting.

The flange is preferably fastened to the wheel carrier with bolts which, for example, are screwed or pressed into the wheel carrier. Other fastening elements are conceivable, such as clamps or the like which engage axially behind the flange at least one fastening edge on a side of the flange which faces away from the wheel carrier. As an alternative to this, bolts are provided which are fastened to the wheel carrier by welding or screwing and onto which in each case a nut is screwed and prestressed axially against the flange. The bolts reach through axial recesses on the flange.

Different embodiments of the flange are provided with the invention. There is provision for the flange to be delimited on the outside via a cylindrical circumferential surface. Another embodiment provides a flange with radially protruding sections which adjoin one another circumferentially. In each case one of the recesses extends radially at least partly in at least two of the sections. As an alternative to this, the recesses are formed on the circumferential side between the sections.

The flange has the recesses in the form of axial holes, and as an alternative, instead of through holes, recesses which pass through the flange axially and are open radially to the outside for the fastening of the flange to a wheel carrier. The fastening elements in each case reach through one of the recesses axially from the wheel carrier and then reach behind the flange at the edge of the recesses. The weight proportion of the overall weight of the flange is therefore reduced considerably, as the material of an annular section of the flange which usually encloses the recesses on the outside is dispensed with. However, the recesses are also radially outwardly open recesses.

One embodiment of the invention provides for the contour of the recesses which are open to the outside to extend arcuately. However, as an alternative, recesses which extend radially from the outside in the manner of a slot in the direction of the rotational axis of the wheel bearing are also provided.

During the manufacture of a flange of this type, the flange which is initially provided with through holes is machined from the outside so as to remove material, for example, until the excess proportion of material which delimits the holes radially on the outside is removed from the flange. As an alternative to this, the contour according to the invention of the flange is produced by punching. This is particularly advantageous when the outer ring is cold formed. Material cutting removal of the edges is therefore superfluous. In this case, the recesses and also the other sections of the flange which are accessible radially from the outside have a punched edge from a punching operation for cutting at least the recesses.

The flange preferably bears axially against the wheel carrier only in sections. Here, the outer ring is in contact radially with a hollow cylindrical section and axially with the flange in such a way, that the wheel carrier does not bear against the concave channel, at which the flange merges into the section. Here, as viewed in a longitudinal section through the outer ring along the rotational axis of the outer ring, the concave contour of the channel merges at a first transition, for example, into a circularly annular face of the flange and at the second transition, for example, into a cylindrical circumferential face of the section. As an alternative to this, the first and the second transitions end, for example, in each case in an annular groove, which is shaped in the manner of an undercut, in the flange or in the section. Here, it is particularly significant that a perpendicular spacing between an imaginary axial extension of the circumferential surface of the flange and the first transition is smaller than a spacing which is parallel to the rotational axis between an imaginary radial extension of the circumferential surface and the second transition.

It has been proven using tests that this design of the contour reduces the maximum notch stress in the channel by approximately 30%. Here, the channel is advantageously described by at least two radii which follow one another between the transitions, at least a first radius merging radially into the flange at the transition and at least a second radius merging axially into the first section at the transition. In longitudinal section in the direction of the transitions, the radii are either separated from one another by a straight line, or preferably merge into one another between the flange and the section.

The outer ring is supported in the wheel carrier at least in sections at least radially with respect to the rotational axis in such a way, that the flange which is formed axially on the end side of the outer ring bears axially against the wheel carrier and radially against the outer ring, without the carrier being in contact with the channel. Additional stresses in the channel as a result of the influence of sharp edges of the carrier are also avoided by a chamfer of sufficient dimensions on the hole.

DETAILED DESCRIPTION OF THE DRAWINGS

Figure 1:
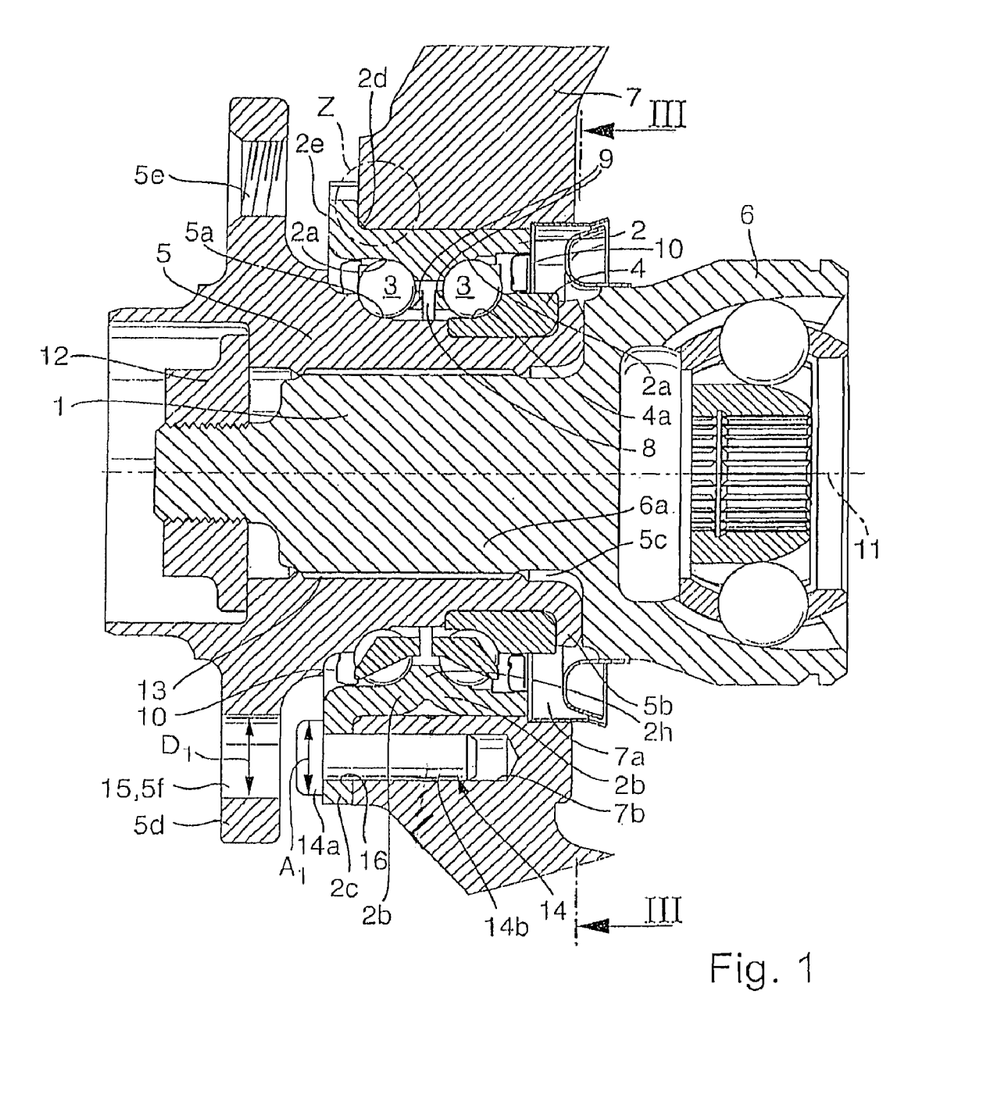
FIG. 1 is a sectional view of the wheel bearing.

FIG. 1 shows a wheel bearing module 1 in a longitudinal section along a rotational axis 11. The wheel bearing module is provided with an outer ring 2, with two rows of rolling bodies 3, with an inner ring 4, with a hub 5 and with an articulation bell 6. The structural unit of the wheel bearing module which is preassembled from the individual parts 2, 3, 4, 5, 6 is seated in a wheel carrier 7.

The wheel bearing 8 comprising the outer ring 2, the rolling bodies 3, in this example in the form of balls, cages 9, seals 10, the inner ring 4 and the hub 5 is preassembled so as to hold together. To this end, the rolling bodies 3 and the inner ring 4 are held in the outer ring 2 by means of the hub 5. Here, one row of the rolling bodies 3 is supported on a raceway 2a of the outer ring 2 and on a raceway 5a which is formed directly on the hub 5. The other row of the rolling bodies 3 is arranged between a further raceway 2a and a raceway 4a of the inner ring 4. The wheel bearing 8 is prestressed without play by means of a flange rim 5b on the hub 5 via the inner ring 4 and the outer ring 2, at least when the wheel bearing 8 is mounted in the wheel carrier 7. The hub 5 is fixed nonreleasably to the wheel carrier 8 via the flange rim 5b.

The hub 5 is configured to be substantially rotationally symmetrical about the rotational axis 11 and has an axial through hole 5c. A stub 6a on the articulation bell 6 reaches through the through hole 5c axially. The articulation bell 6 is secured axially on the hub 5 via a nut 12. A wheel flange 5d which points radially to the outside is formed on the hub 5. A connection which is fixed rotationally about the rotational axis 11 is produced between the articulation bell 6 and the wheel flange 5d via tooth profiles 13 on the stub 6a and on the hub 5.

Axial holes 5e are formed on the wheel flange 5d, into which axial holes 5e wheel bolts (not shown) engage for fastening a vehicle wheel. Furthermore, the wheel flange 5d has axial recesses 5f which lie axially opposite a flange 2c at least once per revolution of the wheel flange 5d about the rotational axis 11, in such a way that the wheel flange 5d does not cover the fastening element 14 axially on account of the recesses 5f. The diameter $D_1$ of the recess 5f which is configured as an axial through hole 15 is greater than the greatest radial dimension $A_1$ of the head 14a.

The outer ring 2 is formed from two hollow cylindrical sections 2b and from the radial flange 2c. The wheel bearing 8 is supported radially in a hole 7a of the wheel carrier 7 via the sections 2b. At one of the sections 2b, the outer ring 2 merges radially into the flange 2c via a channel 2d. The flange 2c bears axially on the outside against the wheel carrier 7 and is engaged from behind by the fastening elements 14 in the form of bolts on the side 2e which faces axially away from the wheel carrier 7. The fastening element 14 is prestressed axially fixedly against the flange 2c with the head 14a, as a shaft 14b which is fixed on the bolt is fixed axially in a fastening hole 7b of the wheel carrier 7. The fastening elements 14 are optionally pressed or screwed into the fastening holes 7b.

Figures 2, 2A, 2B:
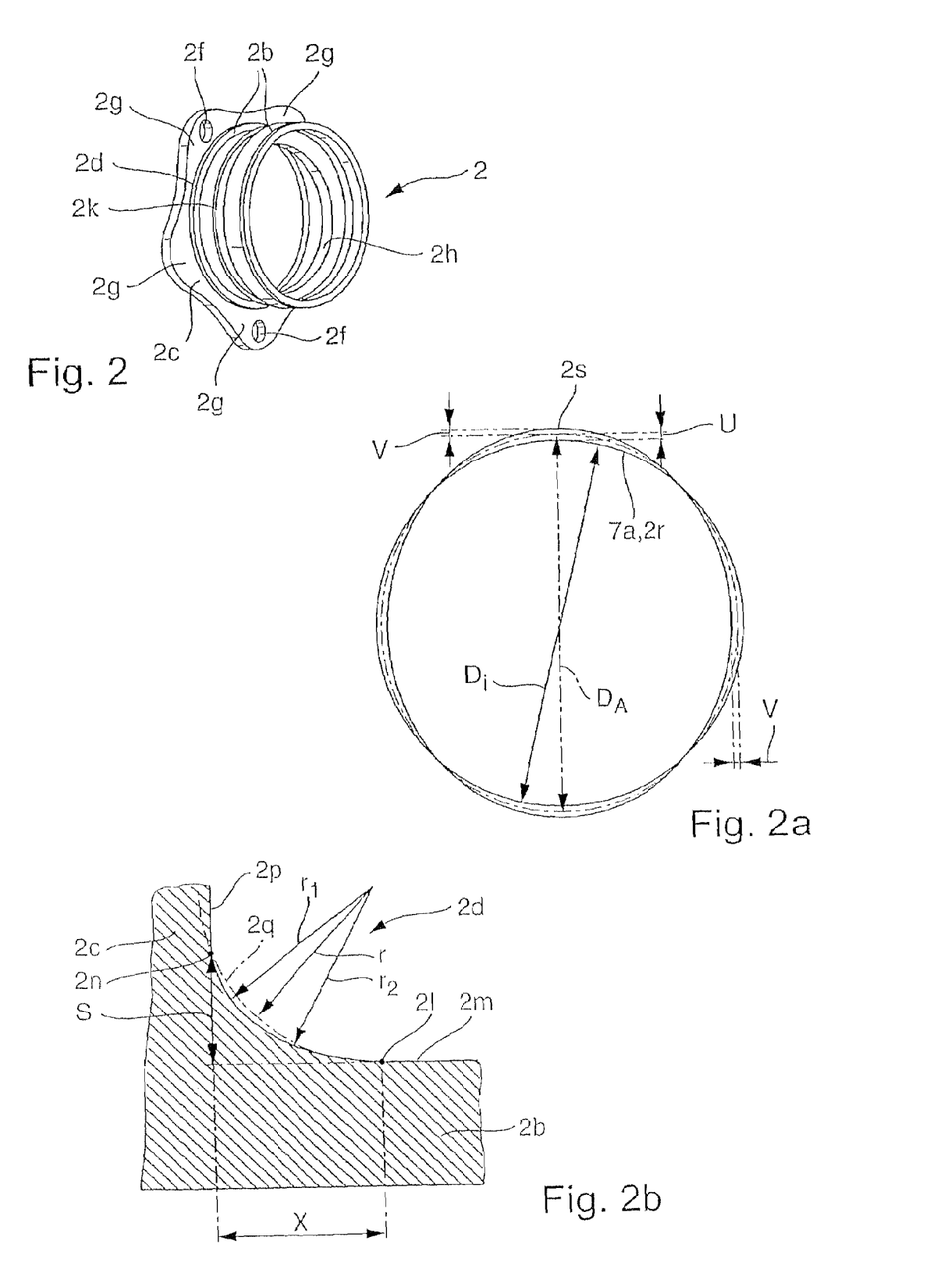
FIG. 2 is a complete view of the outer ring.
FIG. 2a shows the shape deviations of the outer ring.
FIG. 2b is an enlarged illustration of the detail Z from FIG. 1.

FIG. 2 shows a complete view of the outer ring 2. The outer ring 2 is a component which is manufactured by cold forming, the flange 2c of which has radially protruding sections 2g. The recesses 2f are made in three of the sections 2g as axial through holes 16.

FIG. 2a shows the shape deviations of the outer ring 2 as an individual component in comparison with the internal geometry 2r of the hole 7a. On account of its thin wall after cold forming, the outer ring 2 has an external geometry 2s, the diameter $D_A$ of which is initially greater by the excess dimension 2×U than the internal diameter $D_I$ of the hole 7a. In addition, the external geometry 2s deviates by the amount 2×V from the internal geometry 2r of the fastening hole 7a. After mounting of the outer ring 2 in the hole 7a, the outer ring 2 is constricted to such an extent that the external geometry 2s corresponds substantially to the diameter $D_I$ and the internal geometry 2r.

The outer ring 2 has a radial shoulder 2h. The radial shoulder 2h is arranged between the raceways 2a, the raceways 2a being formed at least partially on the radial shoulder 2h. An annular groove 2k is made in the outer ring 2 radially from the outside. On the one hand, the annular groove 2k is resulting from the displacement of material out of the outer ring 2 for forming the radial shoulder 2h, and on the other hand, a certain elasticity is imparted to the outer ring 2 in the region of the raceways 2a. As an alternative to an annular groove in the shoulder, the shoulder is supported completely by the material of the outer ring.

FIG. 2b, an enlarged illustration of the detail Z from FIG. 1, shows the channel 2d in an extremely enlarged illustration which is not to scale. The channel 2d is of concave configuration and merges into a circular cylindrical circumferential surface 2m of the section 2b at a first transition 2l. The channel 2d merges at the transition 2n into a circularly annular face 2p at the flange 2c. The perpendicular spacing S between the imaginary axial extension of the circumferential surface 2m and the transition 2n is smaller than a spacing X which is parallel to the rotational axis 11 between an imaginary radial extension of the circularly annular face 2p and the transition 2l.

FIG. 2b also shows that the contour of the channel 2d deviates from a contour 2q which is shown with dash dotted lines and is described by a radius r in a longitudinal section through the outer ring 2. The channel 2d is described in the longitudinal section of the radii $r_1$ and $r_2$. The radius $r_1$ merges into the flange 2 at the transition 2n and the radius $r_2$ merges axially into the section 2b at the transition 2l. The radii $r_1$ and $r_2$ merge into one another between the flange 2c and the section 2b.

The wheel carrier 7 bears axially against the flange 2c and radially against the section 2b in such a way that the wheel carrier 7 and the channel 2d are spaced apart from one another at least as far as the transitions 2l and 2n. The maximum stresses radially below the recesses 2f are approximately a third higher at the contour 2q which is described by the radius r than the stresses in a channel 2c which is described by the radii $r_1$ and $r_2$.

The wheel flange 5d lies axially opposite the flange 2c and protrudes radially to a greater extent than the flange 2c (FIG. 1), with the result that the flange 2c is initially covered by the wheel flange 5d initially axially in the direction of the wheel carrier 7.

Figure 3:
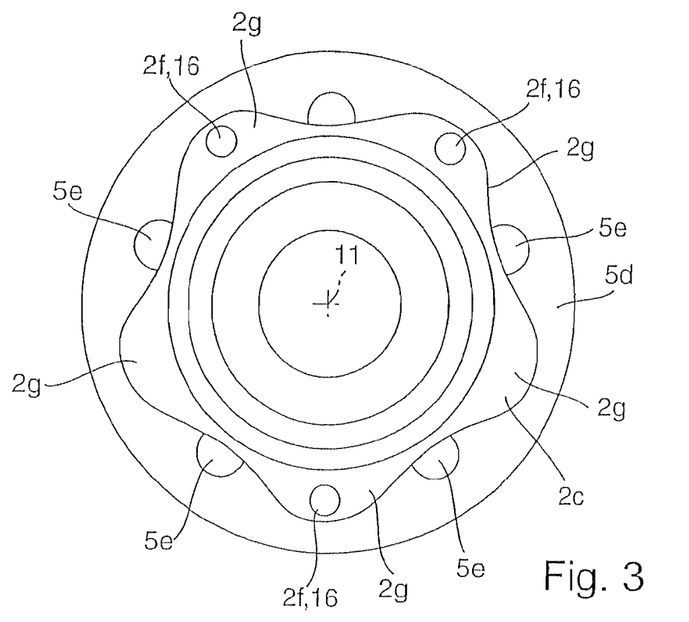
FIGS. 3 and 4 are different front views of the wheel bearing module.
Figure 4:
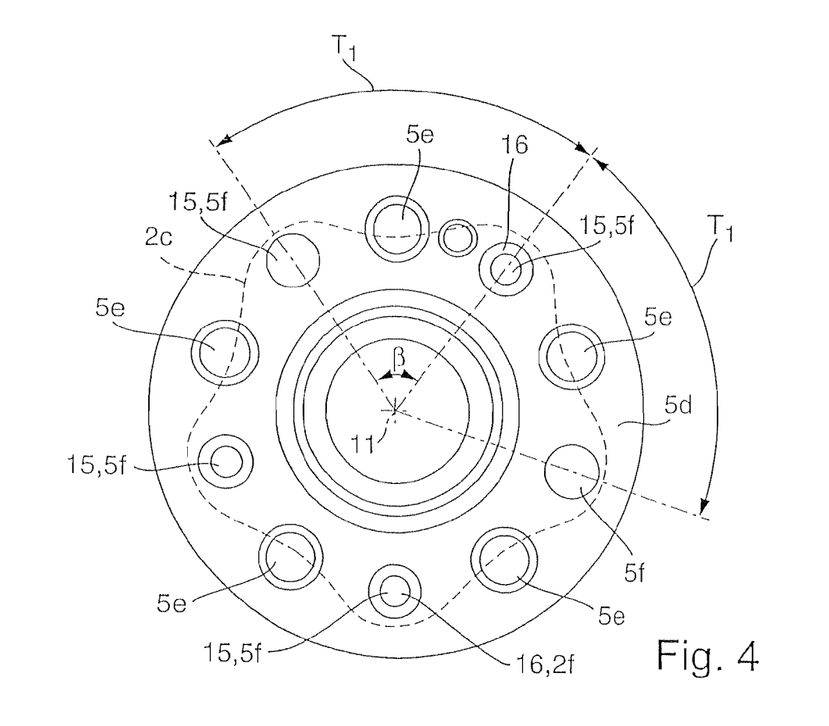

FIG. 3 and FIG. 4 show the wheel bearing module 1 in different front views. FIG. 3 shows the wheel bearing module 1, without articulation bell and without wheel carrier, along the line III-III in the direction according to FIG. 1 which is marked with the arrows. FIG. 4 shows the wheel bearing module 1 in a view which is opposite to that of FIG. 3, with a view of the wheel flange 5d in the direction of the wheel carrier 7. Particularly from FIG. 4 it can be seen that the wheel flange 5d covers the flange 2c on the outer ring 2 completely axially in the direction of the wheel carrier, but in each case one of the recesses 5f, at the same time as the other recesses 5f, lies axially opposite on the wheel flange 5d once per revolution of the wheel flange 5d about the rotational axis 11, in such a way that the wheel flange 5d does not cover the flange 2c axially at the recesses 2f and at the edges of the recesses 2f.

The term "the edges of the recess" is to be understood as the region which adjoins the recesses and on which the fastening elements bear against the flange. For this reason, the recesses 5f are designed to be at least large enough that it is possible for the fastening means 14 with head and also a tool which surrounds the fastening means 14 at the head 14a to be guided axially through the recesses 5f.

The recesses 5f are distributed around the rotational axis 11 with the same pitch $T_1$ with respect to one another, the pitch $T_1$ being predefined by the angle β, in this case β=72°.

The holes 5e in the wheel flange 5d are provided in each case with an internal thread 5g (FIG. 1), into which the wheel bolts are screwed. It is conceivable to use holes 5e without an internal thread at the same time for axial access to the holes 16. This is possible, as an outer envelope circle which surrounds all holes 15 on the outside is greater than an outer envelope circle which surrounds all holes 16 on the outside, and an envelope circle which bears against all holes 15 on the inside is smaller than an inner envelope circle which bears against all holes 16.

The number of recesses 5f on the wheel flange 5 (in this case, five) is greater than the number of recesses (in this case, three) 2f on the flange 2c. However, the number of recesses can also coincide.

As can be seen from FIG. 4, each of the surplus recesses 5f in one of the sections 2g without holes 16 lies axially opposite at the same time as the other recesses 5f. These two sections 2g, which are without the recess 2f, as can be seen from FIG. 3 particularly, are provided for the contact of axial supports for the flange 2 when being pressed into the hole 7a of the wheel carrier. Here, the axial supports reach axially through two of the recesses 5f.

Figures 5, 6, 7:
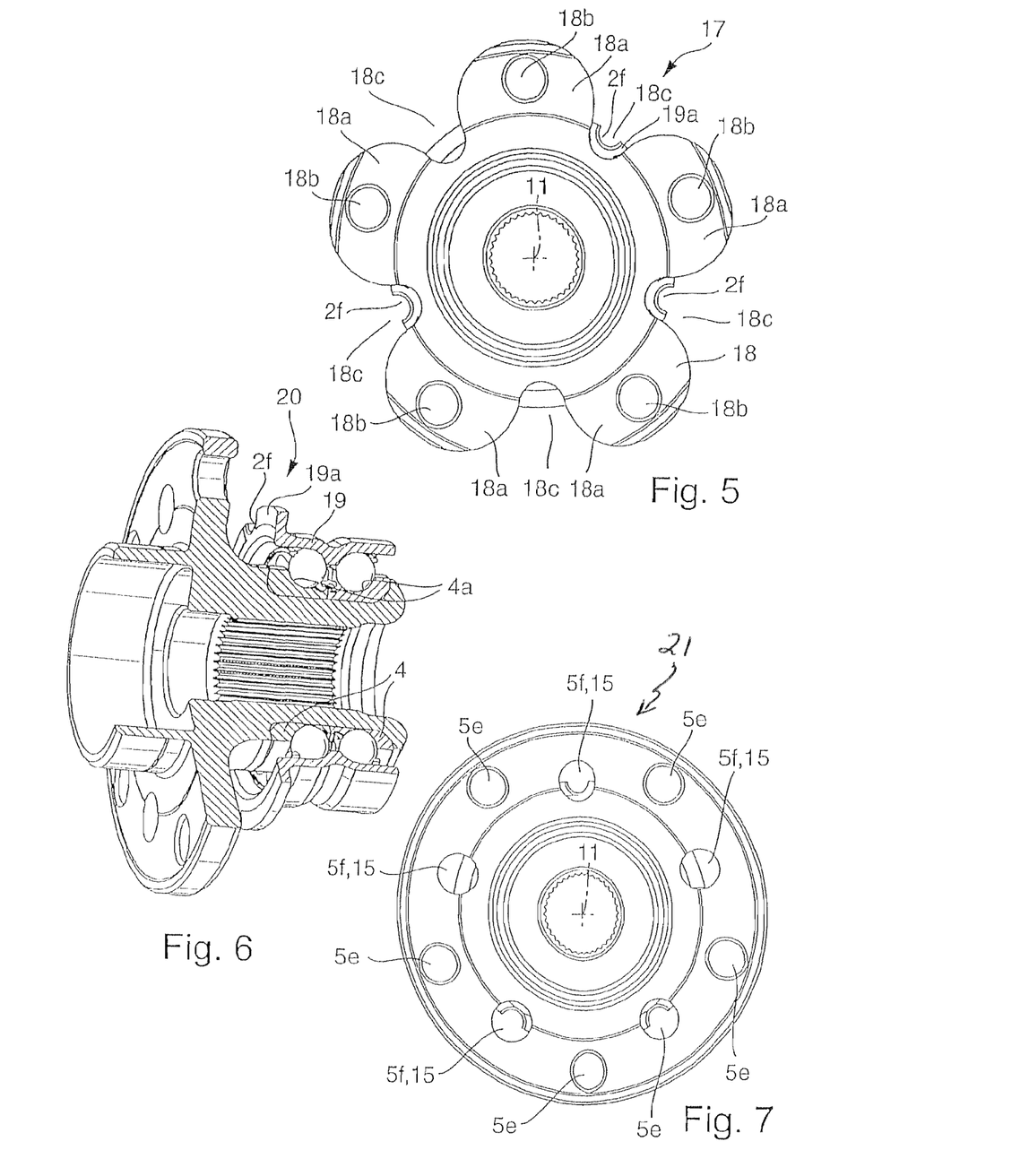
FIG. 5 is an end view of the wheel bearing flange.
FIG. 6 is a view of a wheel bearing.
FIG. 7 is an end view of a wheel bearing.

FIG. 5 shows a wheel bearing 17 with a wheel flange 18. Radially protruding sections 18a of the flange have axial holes 18b, into which wheel bolts (not shown) engage for fastening a vehicle wheel. Between every two circumferentially adjacent sections 18a, a recess according to the invention 18c, open to the outside is formed on the wheel flange. Instead of axial through holes, the flange 19a has arcuate recesses 2f which are open radially to the outside. The wheel flange 18 is rotated into position about the rotational axis 11 with respect to the flange 19a in such a way, that the recesses 2f are not covered by the wheel flange 18 in the axial direction.

Figure 8:
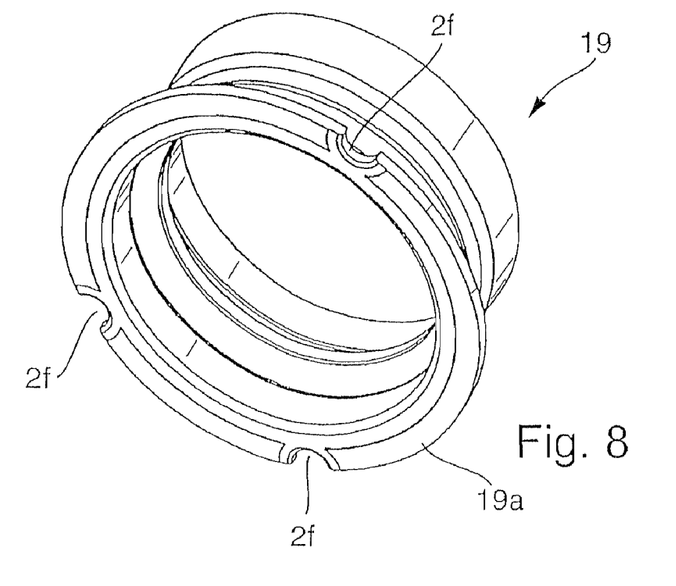
FIGS. 8 and 9 are views of different outer rings.

FIG. 6 shows a wheel bearing 20 for a nondriven vehicle wheel, in which optionally different wheel flanges can be mounted, with an outer ring 19 which is manufactured without cutting. In FIG. 8, the outer ring 19 is shown as an individual component in an overall view and has the radial flange 19a with the recesses 2f of arcuate configuration. The wheel bearing 20 has two of the inner rings 4, on which in each case one of the raceways 4a is formed.

FIG. 7 shows a wheel flange 21, in which the recesses 5f which are formed as holes 15 lie radially closer to the rotational axis 11 than the holes 5e for accommodating the wheel bolts. Both the holes 15 and the holes 5e are distributed on the circumferential side with the same pitch with respect to the rotational axis 11.

Figure 9:
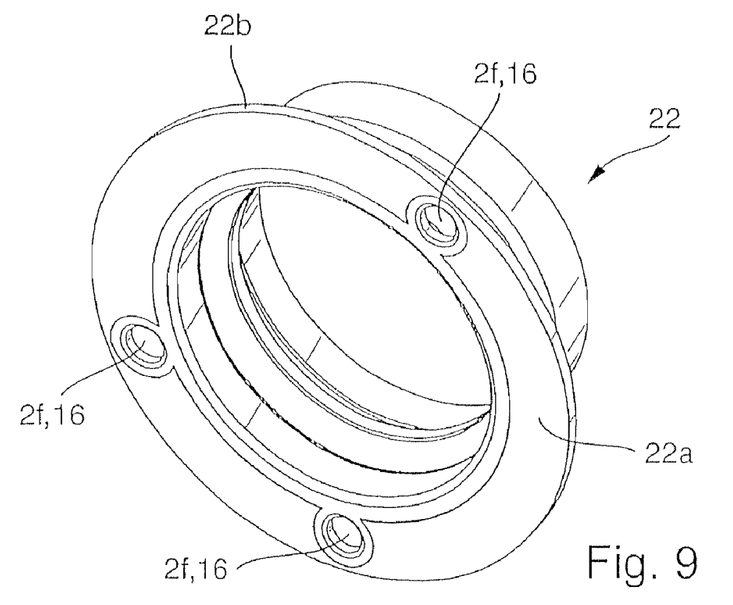

FIG. 9 shows an outer ring 22 which is manufactured by forming and has a flange 22a. The axial recesses 2f are again formed as axial holes 16 in the flange 22a. The flange 22a is delimited on the outside by a circular annular face 22b. The above-described flanges on the outer rings have a punched edge which is produced during cutting of the flanges after cold forming of the outer rings.

Figure 10:
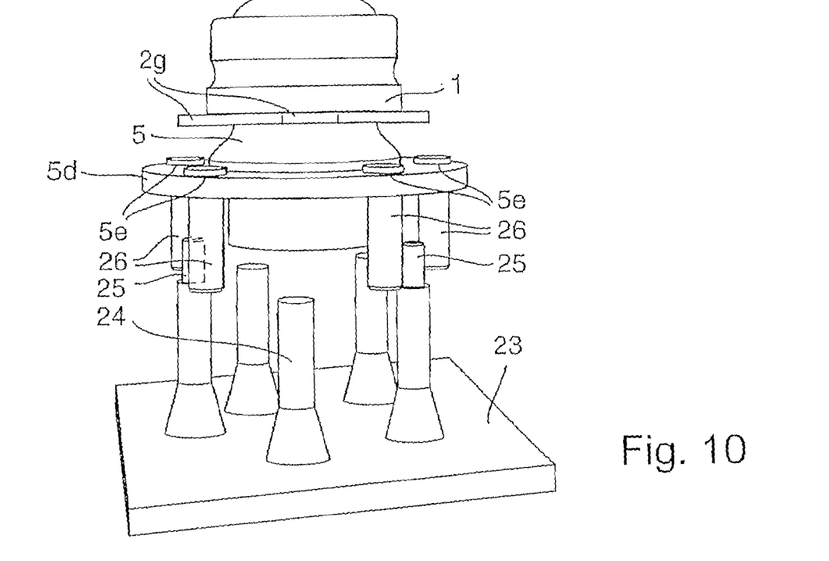
FIGS. 10-14 are view showing the method steps for mounting the wheel bearing module.

FIGS. 10 to 14 describe the individual steps of the method according to the invention for mounting the wheel bearing module 1 in the carrier 7. FIG. 10 shows an apparatus 23 with axial supports 24 and centering bolts 25. The wheel bearing module 1 is oriented with respect to the apparatus 23, with the result that the recesses 2f and 5f in accordance with the illustration FIG. 3 and FIG. 5 lie axially opposite one another. Wheel bolts 26 are accommodated in the holes 5e. Here, the axial supports 24 lie axially opposite the sections 2g without holes.

Figure 11:
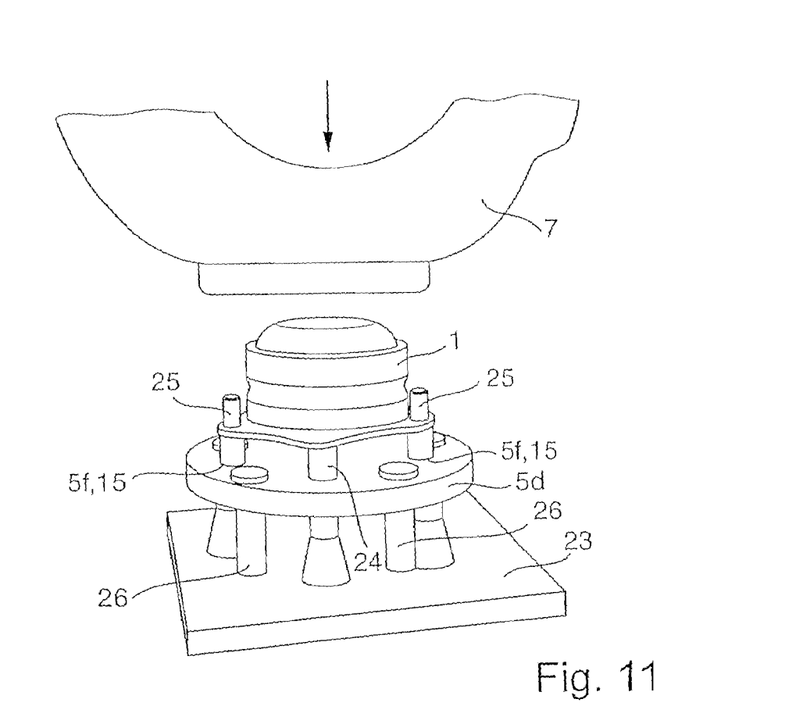

In the illustration according to FIG. 11, the second method step is ended, in which the axial supports 24 and the centering bolts 25 are inserted axially into the respective recesses 5f and therefore finally reach axially through the first recesses 5f. Here, the axial supports 24 reach through the surplus recesses 5f axially and bear against the sections 2g without recesses 2f of the flange 2c. Moreover, the flange 2c also bears axially against the centering bolts. The wheel carrier 7 is oriented with respect to the wheel bearing module 1 and is fed to the wheel bearing module 1 axially in the arrow direction.

Figure 12:
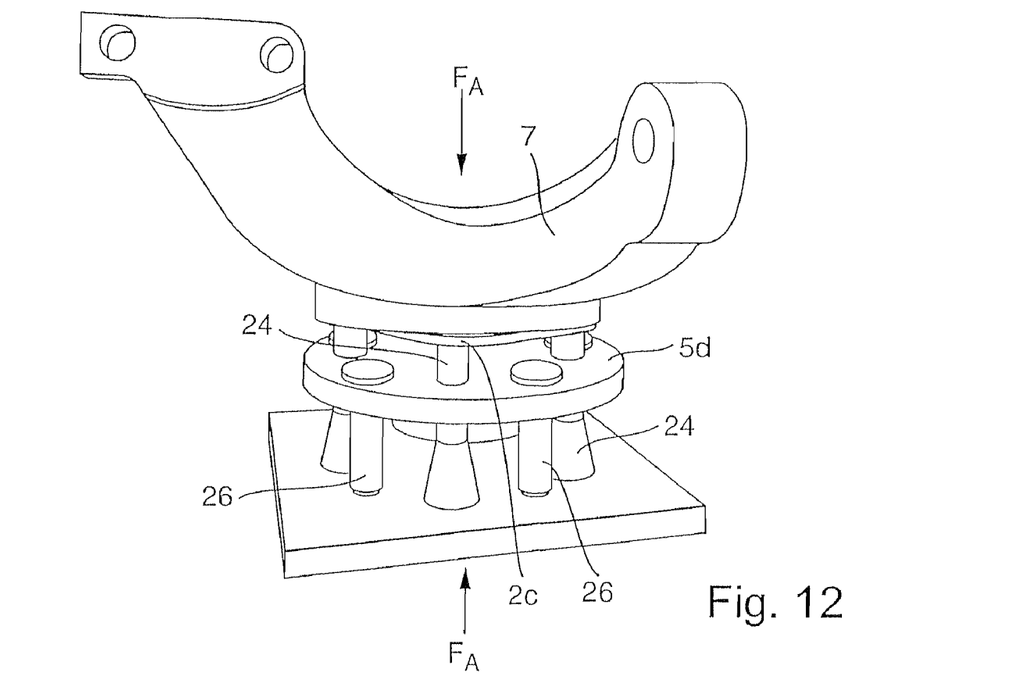

In FIG. 12, the step of axial pressing of the wheel bearing module 1 by means of the assembly forces $F_A$ is ended. Here, the flange 2c is supported on the axial supports 24. The ends of the centering bolts dip into the fastening holes of the wheel flange 7.

Figure 13:
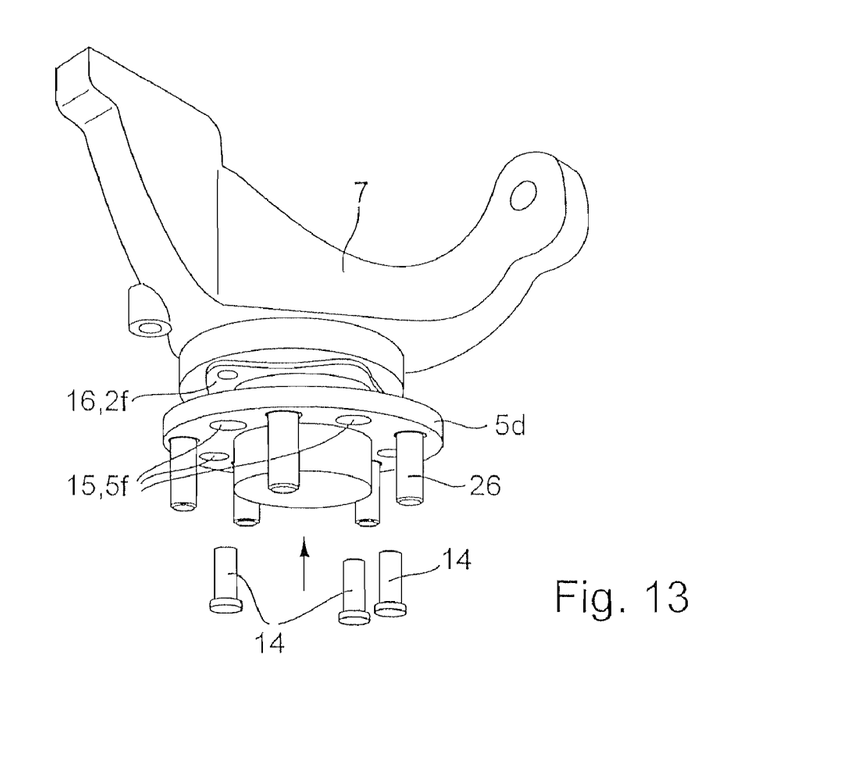

FIG. 13 shows the wheel bearing module 1 which is seated in the wheel carrier 7 via the outer ring 2, and the fastening elements 14 in the form of bolts. The fastening elements 14 are oriented with respect to the recesses 5f which lie axially in front of the recesses 2f, are guided axially through the latter in the arrow direction, and are finally fastened to the wheel carrier 7 through the holes 16.

Figure 14:
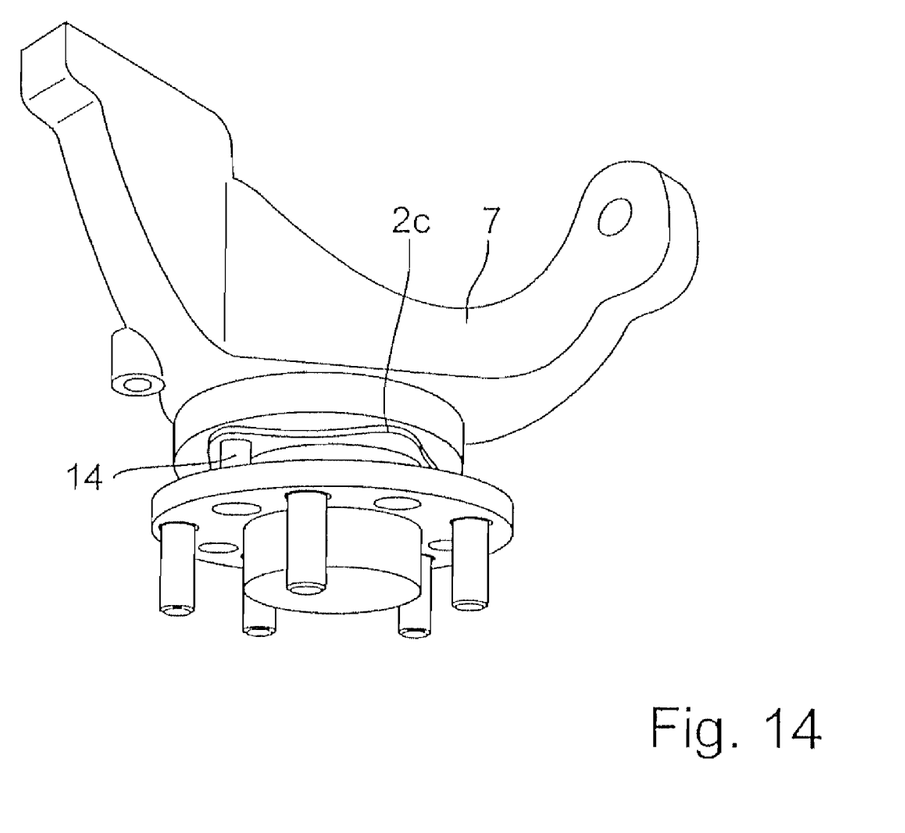

FIG. 14 shows the finally mounted unit in an overall view. The outer ring 2 is secured axially on the wheel carrier with the fastening elements 14.

LIST OF DESIGNATIONS

1 Wheel bearing module
2 Outer ring
2a Raceway
2b Section
2c Flange
2d Channel
2e Side
2f Recess
2g Section
2h Radial shoulder
2k Annular groove
2l Transition
2m Circumferential surface
2n Transition
2p Face
2q Contour
2r Internal geometry
2s External geometry
3 Rolling body
4 Inner ring
4a Raceway
5 Hub
5a Raceway
5b Flange rim
5c Through hole
5d Wheel flange
5e Holes
5f Recess
5g Thread
6 Articulation bell
6a Stub
7 Wheel carrier
7a Hole
7b Hole
8 Wheel bearing
9 Cages
10 Seal
11 Rotational axis
12 Nut
13 Tooth profile
14 Fastening element
14a Head
14b Shaft
15 Hole
16 Hole
17 Wheel bearing
18 Wheel flange 18a Section
18b Hole
18c Hole
19 Outer ring
19a Flange
20 Wheel bearing
21 Wheel flange
22 Outer ring
22a Flange
22b Circular annular face
23 Apparatus
24 Axial supports
25 Centering bolt
26 Wheel bolt

The invention claimed is:

1. A wheel bearing module in a wheel carrier, having a wheel bearing and a wheel flange, the wheel flange mounted by means of the wheel bearing to the wheel carrier such that the wheel bearing module rotates about a rotational axis, the wheel bearing module comprising:
 the wheel bearing has at least one outer ring,
 the wheel bearing is supported in the wheel carrier at least in sections via the outer ring at least radially with respect to the rotational axis,
 the outer ring has a flange which points radially away from the rotational axis axially on the end side of the outer ring,
 the flange is fixed with respect to the wheel carrier axially with fastening elements, the fastening elements reaching at least partially behind the flange on a side of the flange which faces axially away from the wheel carrier,
 the wheel flange lies axially opposite the outer ring, the wheel flange protruding radially away from the rotational axis at least in sections to a greater extent than the flange,
 the wheel flange has first recesses which pass axially through the wheel flange,
 at least one of the first recesses lies axially opposite the flange at least once per revolution of the wheel flange about the rotational axis in such a way, that the wheel flange does not cover the flange axially at least at that location where the fastening elements bears axially against the flange.

2. The wheel bearing module as claimed in claim 1, wherein each of the first recesses lies simultaneously axially opposite the flange at least once per revolution of the wheel flange about the rotational axis in such a way, that the wheel flange does not cover the flange in the axial direction at that location where the fastening elements are in contact.

3. The wheel bearing module as claimed in claim 1, wherein the first recesses are spaced apart from one another around the rotational axis with the same pitch.

4. The wheel bearing module as claimed in claim 1, wherein the first recesses are open radially to the outside.

5. The wheel bearing module as claimed in claim 1, wherein the first recesses are holes which pass axially through the wheel flange.

6. The wheel bearing module as claimed in claim 1, wherein the flange has axial second recesses and the fastening elements reaching axially through the second recesses.

7. The wheel bearing module as claimed in claim 6, wherein the second recesses are open radially to the outside.

8. The radial bearing as claimed in claim 6, wherein the second recesses are axial through holes.

9. The wheel bearing module as claimed in claim 6, wherein the module has more first recesses than second recesses.

10. The wheel bearing module as claimed in claim 6, wherein fastening elements are fixed to the wheel carrier.

11. The wheel bearing module as claimed in claim 1, wherein the fastening elements are bolts.

12. The wheel bearing module as claimed in claim 1, wherein the flange bears axially against the wheel carrier at least in sections.

13. The wheel bearing as claimed in claim 1, wherein the wheel carrier reaches around at least two raceways of the outer ring, a hub being supported in the outer ring such that the hub can rotate about the rotational axis via at least two rows of rolling bodies on the raceways, and the wheel flange leading radially from the hub.

14. The wheel bearing module as claimed in claim 1, wherein a hub is mounted axially nonreleasably with respect to the outer ring in the wheel bearing.

15. The wheel bearing module as claimed in claim 1, the outer ring is cold formed in one piece.

16. A method for mounting the wheel bearing module as claimed in claim 1, in which the wheel bearing is mounted in the wheel carrier with a hub and the wheel flange as a unit, and is fastened to the wheel carrier, the method comprising the following method steps:
 aligning of the first recesses and the second recesses by rotation of the flanges against each other, with the result that each of the first recesses lie simultaneously axially opposite at least one of the second recesses in such a way, that the wheel flange does not cover second recesses in the axial direction,
 inserting centering bolts into the second recesses, the centering bolts reaching axially through at least two of the first recesses,
 axial supporting of the flange on the centering bolts counter to axial assembly forces, the centering bolts reaching axially through the first recesses until the flange is supported on the centering bolts,
 inserting the centering bolts into fastening holes of the wheel carrier,
 axial pressing in of the wheel bearing by means of the assembly forces,
 removing the centering bolts from the fastening holes, from the second recesses and from the first recesses,
 fastening of bolts in the fastening holes, in each case one fastening element being inserted as a bolt axially through one of the first recesses into a second recess and subsequently being fastened in the fastening holes in such a way that a head of the bolt bears axially against one of the edges of one of the second recesses axially.

17. The method as claimed in claim 16, wherein the flange is supported axially counter to the axial assembly forces additionally on axial supports axially, each of the axial supports reaching through the wheel flange axially at a further one of the first recesses and bearing axially against the flange in a manner which is spaced apart from the second recesses.

* * * * *